(12) United States Patent
Cordeiro

(10) Patent No.: US 9,204,587 B2
(45) Date of Patent: Dec. 8, 2015

(54) MANUAL SHOVEL ACCESSORY AND SHOVEL APPARATUS WITH REAR END FULCRUM AND FRONT AND REAR UPRIGHT HANDLES

(71) Applicants: Olavo Cordeiro, Portage la Prairie (CA); Ronald Maddison, North York (CA)

(72) Inventor: Olavo Cordeiro, Portage la Prairie (CA)

(73) Assignee: Ronald Maddison, North York, Ontario (CA)

( * ) Notice: Subject to any disclaimer, the term of this patent is extended or adjusted under 35 U.S.C. 154(b) by 0 days.

(21) Appl. No.: 14/605,483

(22) Filed: Jan. 26, 2015

(65) Prior Publication Data
US 2015/0230385 A1    Aug. 20, 2015

(30) Foreign Application Priority Data

Feb. 18, 2014    (CA) ..................................... 2843213

(51) Int. Cl.
*E01H 5/02*    (2006.01)
*A01B 1/02*    (2006.01)

(52) U.S. Cl.
CPC ................ *A01B 1/028* (2013.01); *A01B 1/026* (2013.01)

(58) Field of Classification Search
USPC .............. 294/53.5, 54.5, 57, 58; 37/264, 265, 37/278, 284, 285; 254/131.5; D8/10
See application file for complete search history.

(56) References Cited

U.S. PATENT DOCUMENTS

| | | | |
|---|---|---|---|
| 462,918 A | 11/1891 | Zabel | |
| 2,441,449 A * | 5/1948 | Shaw | 37/285 |
| 2,470,217 A * | 5/1949 | McLoughlin | 294/54.5 |
| 2,769,612 A * | 11/1956 | Weisheit | 294/59 |
| 2,846,785 A * | 8/1958 | Underwood | 294/54.5 |
| 3,107,446 A * | 10/1963 | Messinger | 294/60 |
| 3,748,761 A * | 7/1973 | Chetwynde | 294/54.5 |
| 4,461,458 A | 7/1984 | Poulin | |
| 4,881,332 A | 11/1989 | Evertsen | |
| 4,944,541 A * | 7/1990 | Waldschmidt | 294/58 |
| 5,048,206 A * | 9/1991 | Jones | 37/265 |
| 5,581,915 A * | 12/1996 | Lobato | 294/58 |
| 5,669,651 A | 9/1997 | Vroegindewey | |
| 5,732,933 A | 3/1998 | Champi | |
| 5,797,637 A | 8/1998 | Ervin | |
| 5,918,921 A | 7/1999 | Samuelson | |
| 6,237,975 B1 | 5/2001 | Drobot | |

(Continued)

FOREIGN PATENT DOCUMENTS

WO    2006119656    11/2006

*Primary Examiner* — Paul T Chin
(74) *Attorney, Agent, or Firm* — Kyle R. Satterthwaite; Ryan W. Dupuis; Ade + Company Inc.

(57) ABSTRACT

A shovel accessory features a main longitudinal beam having opposing front and rear ends for supporting the handle shaft of a shovel thereon, an undercarriage depending downward from the beam to define a fulcrum point when in contact with the ground, and front and rear handle arrangements residing above the main beam at locations respectively nearer to the opposing ends thereof. The front and rear handles provide gripping points for respective hands of the user for pivoting of the main beam and shovel about the fulcrum in a direction lifting the shovel head under rearward pulling of the front handle arrangement. The dual elevated handle arrangement is particularly well suited for a rearward throwing action of material from the shovel head compared to prior fulcrum/ lever shovel solutions.

30 Claims, 5 Drawing Sheets

(56) References Cited

U.S. PATENT DOCUMENTS

| | | | |
|---|---|---|---|
| 6,663,085 B1 * | 12/2003 | Dalon | 254/131.5 |
| 6,922,920 B1 | 8/2005 | Stratz | |
| 7,111,418 B2 | 9/2006 | Noonan | |
| 7,654,592 B2 * | 2/2010 | Stenzel | 294/54.5 |
| 8,240,069 B2 * | 8/2012 | Adinata | 37/285 |
| 2005/0160632 A1 | 7/2005 | Williams | |
| 2007/0227048 A1 | 10/2007 | Adinata | |
| 2009/0108602 A1 * | 4/2009 | Strenzel | 294/54.5 |

\* cited by examiner

US 9,204,587 B2

MANUAL SHOVEL ACCESSORY AND SHOVEL APPARATUS WITH REAR END FULCRUM AND FRONT AND REAR UPRIGHT HANDLES

CROSS REFERENCE TO RELATED APPLICATIONS

This application claims benefit under 35 U.S.C. 119(a) of Canadian Patent Application Serial No. 2,843,213, filed Feb. 18, 2014.

FIELD OF THE INVENTION

The present invention relates generally to manual shovels, and more particularly to an accessory for a manual shovel that provides a fulcrum point and pair of handles by which physical effort in ground prying and load throwing actions can be reduced to reduce the risk of strain or injury.

BACKGROUND OF THE INVENTION

Many devices have been previously proposed in the prior art for the purpose of reducing effort and strain experienced by users of manual shovels, for example to reduce the risk of back injuries or other hazards.

Among such devices are found many shovel designs or accessories in which wheels or a fulcrum point are provided in order to allow use of the shovel in a lever-like manner, where the shovel head at one end of the handle shaft pivots upwardly about the wheel axis or fulcrum point under downward manual displacement of a handle grip at the other end of the shaft.

Examples of prior art designs or accessories for manually operated shovels, forks and the like includes those disclosed in PCT Publication WO2006/119656, U.S. Patent Application Publications 2005/0160632 and 2007/0227048, and U.S. Pat. Nos. 4,62,918, 4,461,458, 4,881,332, 5,669,651, 5,732, 933, 5,797,637, 5,918,921, 6,237,975, 6,663,085, 6,922,920, 7,111,418 and 8,240,069.

Despite the significant number of prior accessories for shovels and similar tools, Applicant has found a remaining desire for a shovel accessory or apparatus which aids in a rearward throwing action employed in many shoveling operations for the purpose of clearing the dug-up material from the area being excavated.

In such instances, an initial downward digging in of the shovel head and prying up of the earth or other material is followed by continued upward swinging of the shovel head past a 9 o'clock position so as to throw the material on the shovel head upward and backward. Repeated performance of such operation with a conventional shovel can create significant strain to the operator's back.

SUMMARY OF THE INVENTION

According to one aspect of the invention there is provided a shovel accessory for a shovel having a handle shaft and a shovel head attached to an end thereof, the accessory comprising:

a main longitudinal beam having opposing front and rear ends;

a shovel attachment mechanism arranged to secure the shovel to the main longitudinal beam in a position laying the handle shaft of the shovel along the main longitudinal beam with the shovel head situated beyond the front end of the main longitudinal beam;

an undercarriage depending downward from the main longitudinal beam and defining a ground engagement portion at a distance below the main longitudinal beam at a location nearer to the rear end of the main longitudinal beam than to said front end thereof so that the ground engagement portion defines a fulcrum of the main longitudinal beam at said location when the ground engagement portion is in contact with the ground; and a front handle arrangement supported on the main longitudinal beam in a position thereabove at an intermediate location therealong between the ground engagement portion of the undercarriage and the front end of the main longitudinal beam;

a rear handle arrangement supported on the main longitudinal beam in a position thereabove at a rearward position nearer to the ground engagement portion of the undercarriage than said front handle arrangement;

whereby the front and rear handle arrangements provide points for gripping of the accessory by respective hands of a user to pivot the main longitudinal beam and attached shovel about the fulcrum in order to lift the shovel head thereabout under rearward pulling of the front handle arrangement.

The undercarriage may comprise at least one ground wheel for rolling support of the apparatus, in which case the ground engagement portion is preferably positioned rearward of a rotational axis of the at least one ground wheel to contact the ground under tilting of the shovel accessory rearward about said rotational axis of the at least one ground wheel.

Preferably the under carriage comprises front and rear frame members converging downwardly from the main longitudinal beam toward the ground engagement portion to define a generally triangular frame with a rear portion of the main longitudinal beam that spans between points at which the frame members connect to said main longitudinal beam.

The rear handle arrangement and the rear frame member of the undercarriage may share a same connection to the main longitudinal beam.

The front handle arrangement and the front frame member of the undercarriage share a common connection to the main longitudinal beam, which may be a pivotal connection defining a pivot axis perpendicular to the main longitudinal beam, and the rear frame member comprises a series of selectable attachment points at which the main longitudinal beam is securable to the rear frame member.

Preferably the undercarriage is connected to the main longitudinal beam by a pivotal connection defining a pivot axis perpendicular to the main longitudinal beam to enable adjustment of the location of the ground engagement portion relative to the main longitudinal beam.

A handle grip of the front handle arrangement may be adjustable in position relative to the main longitudinal beam, for example by adjustable mounting of the handle grip on a lower portion of the front handle arrangement attached to the main longitudinal beam. In such instance, the front handle arrangement may comprise a telescopic connection between the handle grip and the lower portion of the front handle arrangement.

Preferably the rear handle arrangement comprises an upright portion extending upward from the main longitudinal beam and a rearward portion jutting rearward from the upright portion at a point thereon spaced above the main longitudinal beam.

Preferably the upright portion comprises an extension portion that reaches upwardly past the point thereon from which the rearward portion extends, the extension portion and the rearward portion defining differently oriented hand grips for selective rearward pulling or downward pushing of the rear handle arrangement about the fulcrum.

Preferably the shovel attachment mechanism is arranged to secure the handle shaft of the shovel in place atop the main longitudinal beam.

Preferably the front handle arrangement comprises a front shaft-accommodating opening arranged to accommodate passage of the handle shaft of the shovel therethrough.

Preferably the rear handle arrangement comprises a rear shaft-accommodating opening arranged to accommodate passage of the handle shaft of the shovel therethrough.

Preferably each shaft-accommodating opening has a greater height than width, the height being sufficient to enable passage of a handle grip of the shovel through the shaft-accommodating with the handgrip in an upright orientation and the width being insufficient to allow passage of the handle grip through the shaft-accommodating with the handgrip in a horizontal orientation.

Preferably the shovel attachment mechanism comprises a plurality of clamping devices at spaced apart positions along the main longitudinal beam.

Preferably there is provided a side handle offset to a side of the main longitudinal beam proximate the rear handle arrangement. Preferably the side handle is a detachable handle.

Preferably the side handle is adjustable in position relative to the main longitudinal beam, for example via a plurality of selectable attachment points at which the detachable side handle is attachable Preferably the side handle in adjustable in height relative to the main longitudinal beam, for example via vertical spacing of the selectable attachment points from one another at different heights relative to the main longitudinal beam.

Preferably the side handle in adjustable to reside at either side of the main longitudinal beam.

At least some of the plurality of selectable attachment points may be defined on the rear handle arrangement, and at least some of the plurality of selectable attachment points may be defined on the undercarriage.

Accordingly to a second aspect of the invention, there is provided a shovel apparatus comprising:

a main longitudinal member having opposing front and rear ends;

a shovel head supported on the main longitudinal member in a position situated beyond the front end of the main longitudinal member;

an undercarriage depending downward from the main longitudinal member and defining a ground engagement portion at a distance below the main longitudinal member at a location nearer to the rear end of the main longitudinal member than to said front end thereof to define a fulcrum of the main longitudinal beam at said location when the ground engagement portion is in contact with the ground; and a front handle arrangement supported on the main longitudinal member in a position thereabove at an intermediate location therealong between the ground engagement portion of the undercarriage and the front end of the main longitudinal member;

a rear handle arrangement supported on the main longitudinal member in a position thereabove at a position nearer to the ground engagement portion of the undercarriage than said front handle arrangement;

whereby the front and rear handle arrangements provide points for gripping of the accessory by respective hands of a user to pivot the main longitudinal member about the fulcrum to lift the shovel head thereabout under rearward pulling of the front handle arrangement.

BRIEF DESCRIPTION OF THE DRAWINGS

In the accompanying drawings, which illustrate an exemplary embodiment of the present invention.

DETAILED DESCRIPTION

Figure 1:
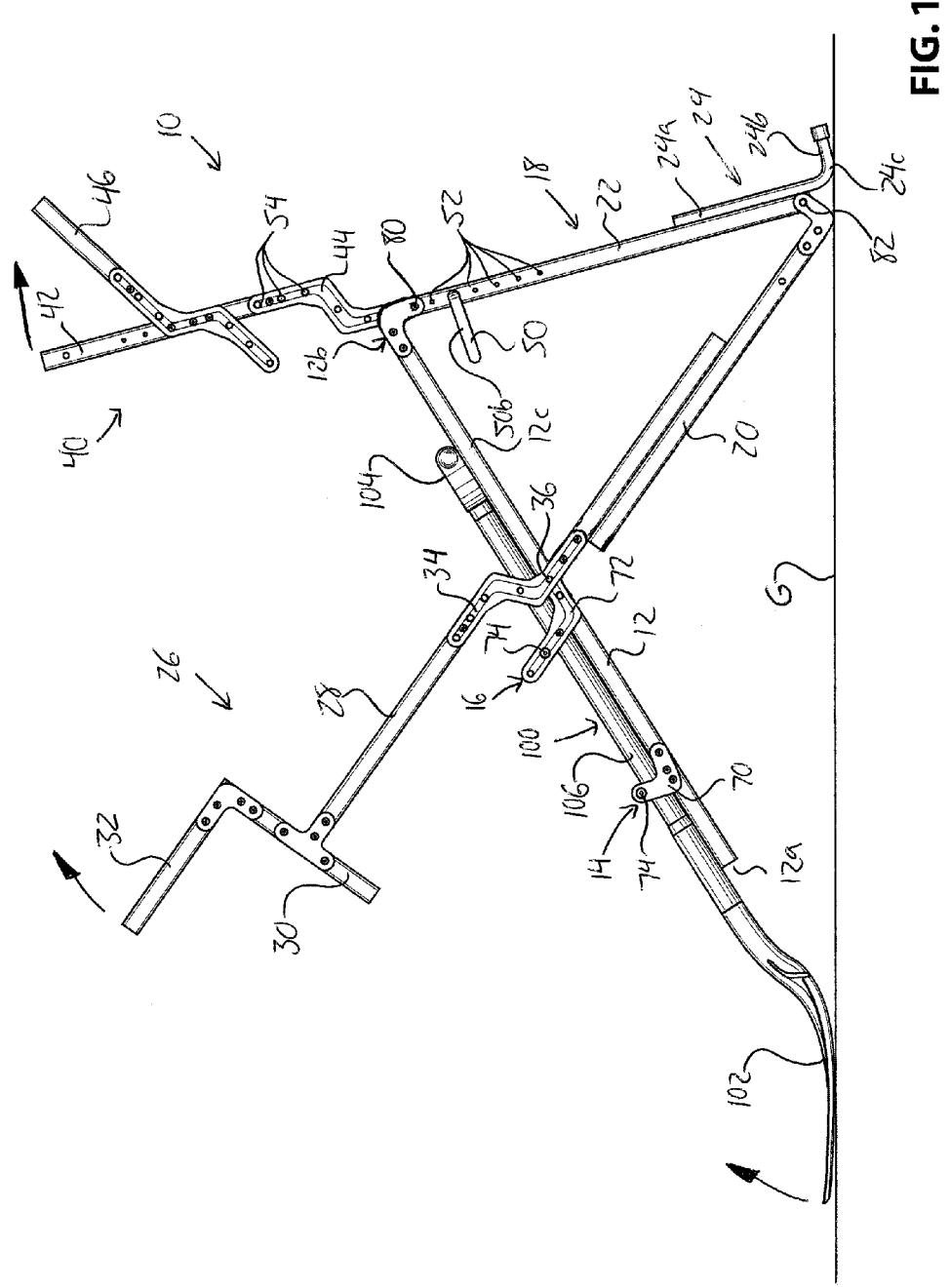
FIG. 1 is a left side elevational view of a shovel accessory of the present invention in a ready-for-use assembled state with a conventional short handled shovel.
Figure 3:
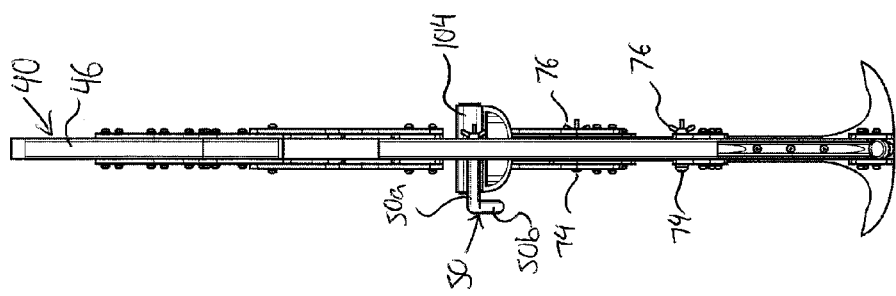
FIG. 3 is a rear elevational view of the shovel accessory and shovel of FIG. 1.
Figure 2:
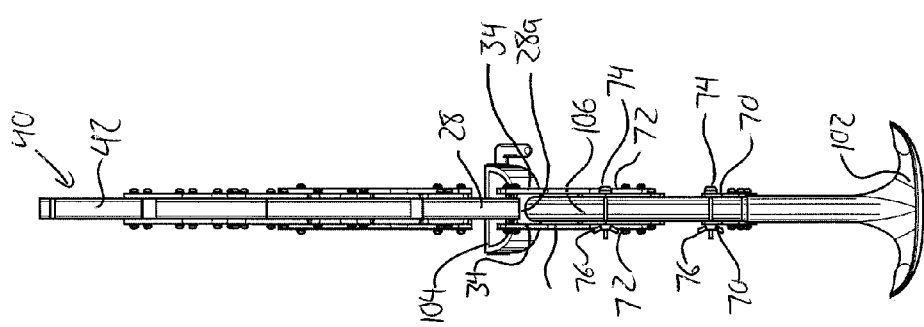
FIG. 2 is a front elevational view of the shovel accessory and shovel of FIG. 1.

The drawings show a shovel accessory 10 of the present invention for use in combination with a conventional manual shovel 100 that features a shovel head 102 and a handle grip 104 respectively mounted at opposing ends of a linear handle shaft 106. The end of the handle shaft 106 to which the shovel head 102 is mounted is referred to herein as the 'front' or 'forward' end of the handle shaft, with the opposing handle-equipped end of the shaft 106 accordingly being referred to as the 'rear' end of the handle shaft. The accessory 10 of the present invention provides the shovel with a ground-engaging fulcrum point located distally rearward to the shovel head, and a pair of upright handle arrangements situated upwardly of the longitudinal axis of the handle shaft 106 for comfortable two-handed tilting of the shovel rearwardly about the fulcrum in order the throw the dug material rearwardly from the shovel head pas the standing position of a user/operator of the assembly.

In the illustrated 'rest position' of the assembled shovel and accessory on horizontal ground G in FIG. 1, the shovel head 102 lies generally flat atop the ground with the handle shaft 106 angling obliquely upward and rearward relative to the ground G. The same 'front/forward' and 'rear' designation used in distinguishing relative positioning of components in the horizontal direction with regard to the shovel is likewise used herein with regard to the shovel accessory 10 of the present invention. It will be appreciated that any such use of these terms is not intended to denote a particular orientation in which an apparatus must be oriented at any given time in order to read on the claimed invention.

The accessory 10 features a main longitudinal beam 12 atop which the handle shaft 106 of the shovel 100 is received during assembly of the shovel and accessory. The linearly-extending main beam 12 and handle shaft 106 lie parallel to one another, and are secured together by front and rear clamps 14, 16 that are fixed to the main beam 12 at locations respectively residing near a lower front end 12a of the main beam and an intermediate point on the beam that is generally central of its length. The front end 12a of the main beam 12 stops short of the front end of the handle shaft 106 at which the shovel head 102 is mounted, whereby in the rest position, the front end 12a of the main beam lies rearward of the shovel head 102 at a height spaced above the ground G, with the shovel reaching downwardly and forwardly beyond the front end 12a of the beam 12 to lie in contact with the ground G.

An undercarriage 18 of the accessory 10 features an obliquely oriented front frame member 20 connected to the main beam 12 at an approximately central intermediate point therealong, from which this front frame member 20 extends downward and rearward from the main beam 12. A rear frame member 22 of the undercarriage 18 has a lower end thereof connected to the lower end of the front frame member 20, and extends upward therefrom to connect to the main beam proximate a rear end 12b thereof. An L-shaped pipe 24 has one leg 24a thereof fixed to a rear face of the rear frame member 22 in a manner lying parallel thereto so as to place the other leg 24b of the pipe 24 in a position jutting rearwardly from the rear frame member 22. The rear frame member 22 is obliquely sloped in the same direction as the front frame member 20, but at a lesser angle relative to vertical (i.e. at a greater acute angle relative to ground), and so the rearward jutting second leg 24b of the L-shaped pipe slopes slightly upward relative to ground in the rearward direction. A rounded corner bend 24c between the two legs 24a, 24b of the L-shaped pipe 24 provides a fulcrum point that defines a horizontal pivot axis perpendicular to the vertical plane in which the main beam 12 and undercarriage 18 reside.

A front handle arrangement 26 features a lower support portion 28 lying above the main beam 12 in an oblique orientation lying parallel to the front frame member 20 of the undercarriage, thus sloping upwardly and forwardly away from an approximate midpoint of the main beam 12 in the same vertical plane occupied by the main beam 12 and undercarriage frame members 20, 22. A cross-piece 30 is attached to the upper forward end of the lower support portion 28 to lie perpendicularly thereto in the same vertical plane. A rear upper end of the cross-piece 30 carries a hand grip member 32 that extends perpendicularly upward and forward from the cross-piece 30, thus lying parallel to the lower support portion 28, but offset rearwardly therefrom in the same vertical plane. The lower support portion 28 is connected to the front frame member 20 of the undercarriage on each side of the main beam 12 by one of a pair of matching flat-plate side brackets 34.

A lower end 28a of the lower support portion is spaced a distance above the main beam 12, whereby a space bound by the topside of the main beam 12, the lower end 28a of the front handle support portion 28, and the two side bracket plates 34 defines a shaft-accommodating opening of the front handle arrangement 26 through which the handle shaft 106 of the shovel 100 extends in its travel from the shovel head 102 to the handle grip 104. A horizontal pivot pin 36 passes perpendicularly through the main beam 12 and the two side bracket plates 34 on opposing sides thereof in order to define a pivotal connection of the main beam 12 with both the front handle arrangement 26 and the front frame member 20 of the undercarriage 18.

A rear handle arrangement 40 features a first grip bar 42 situated at an elevation above that of the rear end 12b of the main beam 12. An orientation of the first grip bar 42 matches the slope of the rear frame member 22 of the undercarriage 18 in the same vertical plane. A second pair of matching side plate brackets 44 connects the rear frame member 22 of the undercarriage 18 to the first grip bar 42 on opposing sides of the main beam 12 in order to define another shaft-accommodating opening bound between the side bracket plates 44 at the topside of the main beam 12. A second grip bar 46 of the rear handle assembly 40 juts rearwardly from a generally intermediate point of the first grip bar 42, and lies in the same vertical plane, with an upwardly sloped orientation relative to ground G. While the illustrated embodiment features a short-handled shovel 100 whose hand grip 104 resides atop a rear portion 12c of the main beam 12 that spans between the frame members 20, 22 of the undercarriage, the shaft-accommodating opening of the rear handle arrangement acts similarly that of the front handle arrangement to accommodate the handle shaft of a longer shovel whose shaft length exceeds the length of the main beam. When such a shovel is used, its handle grip 104 lies rearwardly of the rear pair of side bracket plates 44 when the shovel and accessory are assembled and ready for use.

A detachable side handle 50 is selectively attachable to either side of the rear frame member 22 of the undercarriage 18 at any one of a number of selectable mounting holes 52 disposed at different heights along the rear frame member of the undercarriage, or at any one of a number of selectable mounting holes 54 disposed at different heights along the first grip bar 42 of the rear handle arrangement at positions below the connection of the second grip bar 46. The attachable side handle 50 is L-shaped so as to have a first leg 50a that extends perpendicularly outward from the vertical plane occupied by the main beam 12, undercarriage 18 and front and rear handle arrangements 26, 40 of the accessory. The second leg 50b of the side handle 50 turns forwardly from the first leg 50a to run generally along the main beam 12 in a direction parallel to the vertical plane thereof.

Figure 5:
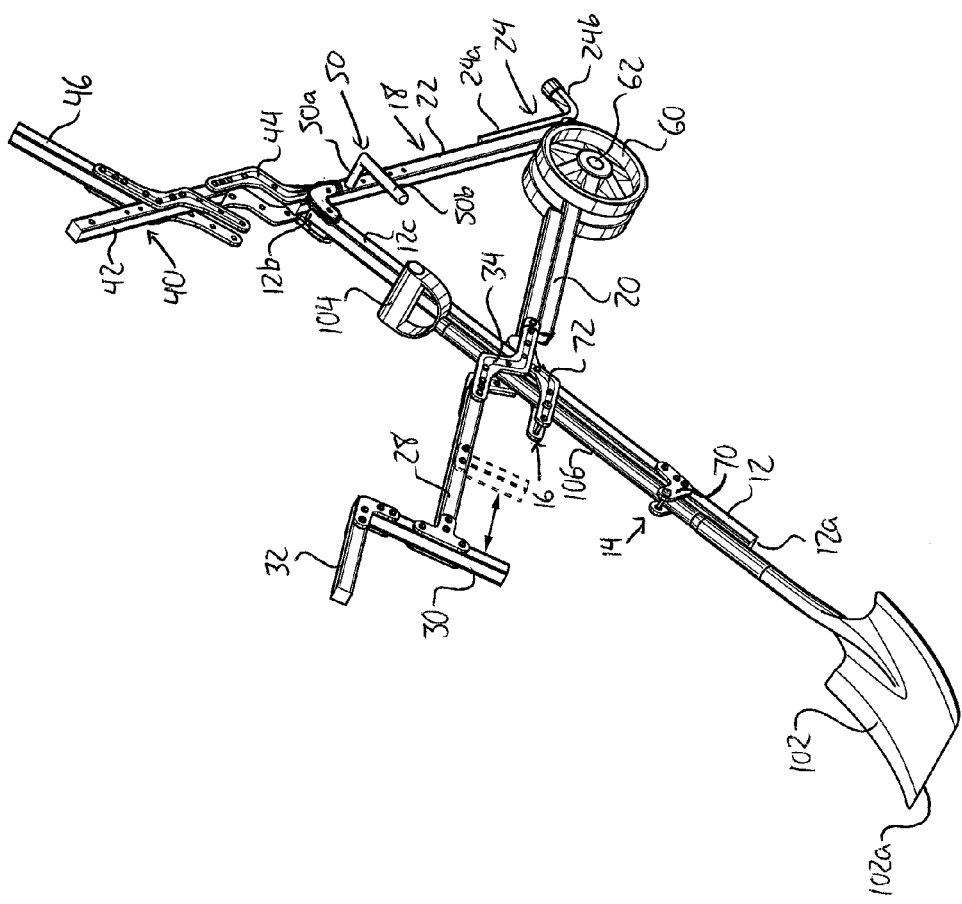
FIG. 5 is a front side perspective view of the shovel accessory and shovel of FIG. 4 with optional wheels mounted thereon.

Turning to FIG. 5, a pair of ground wheels 60 may be rotatably mounted on either side of the undercarriage, for example by a shared axle 62 passing perpendicularly through the front frame member 20 of the undercarriage, in order to rollably support the assembled shovel 100 and accessory 10. With the assembled shovel and accessory in the rest position with the wheels installed, the wheels 60 reside in contact with the ground, and the corner bend 24c of the L-shaped pipe 24 is slightly elevated out of contact with the ground, as opposed to the rest position of FIG. 1 in which the wheels are removed and the corner bend 24c of the pipe 24 lies in contact with the ground to define the fulcrum point. Accordingly, with the wheels 60 installed and the shovel head in a lowered position on or near the ground G, the assembly can be rolled forward and backward for reduced-effort maneuvering of the assembly along the surface of the ground G. Rearward tilting of the assembly about the rotational axis of the wheel axle 62 in a rearward direction that acts to elevate the shovel head also lowers the bend 24c of the L-shaped pipe 24 about the axle's rotational axis and into contact with the ground G, at which time this point of engagement between the ground and the pipe bend 24c forms a fulcrum of the assembly, about which further rearward tilting of the assembly can be performed to further raise the shovel head 102 past a nine o'clock position to throw shovel-carried material rearward from the shovel head.

This throwing action is imparted in a two-handed manner, in which a user stands beside the assembly in a position facing theretoward at the space between the two handle arrangements 26, 40. The user grips the hand grip member 32 of the front handle arrangement 26 with one hand, and grips either the first or second grip bar 42, 46 of the rear handle arrangement with the other hand. A right-handed user would generally tend to use his/her left hand on the front handle arrangement 26, and his/her right hand on the rear handle arrangement 40, and thus would typically stand on the left side of the assembly. A left-handed user would typically adopt the reverse stance and grip, i.e. standing on the right of the assembly with the right hand on the front handle arrangement 26 and the left hand on the rear handle arrangement 40. Tilting or swinging of the assembly about the horizontal pivot axis provided by the ground engaging fulcrum 24c is imparted by pulling rearward and upward on the hand grip 32 of the front handle arrangement, and either pulling rearward on the first grip bar 42 or pushing downward and rearward on the second grip bar 46 of the rear handle arrangement 40.

While the front and rear handle arrangement situated upwardly of the longitudinal axis of the shovel's handle shaft are particularly useful for comfortable, reduced effort throwing operations using the fulcrum, the same handle arrangements can likewise be employed to impart a reduced effort leveraging effect during the initial 'dig out' phase of a shovel operation. The entire assembly is lifted from the ground G, and tilted forward in order to point the tip 102a of the shovel head 102 down, at which point it is pierced into the ground in a conventional manner. The front and rear handle assemblies are pulled back down toward the ground G, thus forcing the shovel tip upward to initiate the breaking free or prying out of the earth in front of the ground piercing shovel head. If the earth is not fully freed by the time the ground engaging fulcrum point 24c reaches the ground, then further leverage can be applied by forcing the handle arrangements 26, 40 rearwardly about the fulcrum axis in the same manner described for the 'throwing' action.

The detachable handle 50 is optionally installed by the user on the side of the assembly opposite that on which the user stands during the above described left or right handed use, and can be used to impart a lateral load-dumping or tossing action to the material on the shovel head. The drawings show the detachable handle 50 installed on the left side of the assembly for manipulation by a left-handed user standing on the right side of the assembly. The user's front hand grasps the front grip 32 in the same manner as for the throwing action, but the rear hand, instead of grasping one of the rear grip bars 42, 46, reaches over the rear portion 12c of the main beam to grasp the second leg 50b of the detachable handle 50. The rear arm is brought upward, lifting the entire assembly up from the ground while tilting the same about a longitudinal axis in order to shift the assembly from its vertical resting plane toward a horizontal plane, whereby the width the shovel head shifts from a generally horizontal orientation (carrying a load atop the shovel) into a generally vertical orientation 'dumping' its contents to the side. By employing a simultaneous swing of the tilted assembly about an upright axis during the side-handle tilting operation, the shovel head will laterally 'toss' its contents to the side (i.e. to a position behind the back of the user).

In the illustrated embodiment, each shovel-securing clamp 14, 16 features a pair of bendable plates 70, 72 fixed to each side of the main beam 12 at a respective position along the front portion thereof that reaches toward the shovel head 102 from the intermediate point at which the front handle arrangement and front undercarriage member 20 are connected to the beam 12. At each clamp, a bolt 74 is fed through aligned holes in the respective pair of plates 70, 72 from one side of the accessory so as to pass over the handle shaft 106 of the shovel. A wingnut 76 is threaded onto the bolt 74 at the other side of the accessory. Tightening of this bolt and wingnut fastener acts to draw together the portions of the plates 70, 72 that extend upward from the main beam 12, thereby clamping the handle shaft 106 of the shovel in place between the tightened-together plates 70, 72. Other means for securing the handle shaft of the shovel to the accessory may alternatively be employed, for example replacing each of the illustrates clamps with a fold-over clamp that is hinged to one side of the main beam to pivot into and out of a closed position clamping across the top of the handle shaft 106 for tightening down of the clamp at the side of the beam opposite the hinge of the fold-over clamp.

Figure 6:
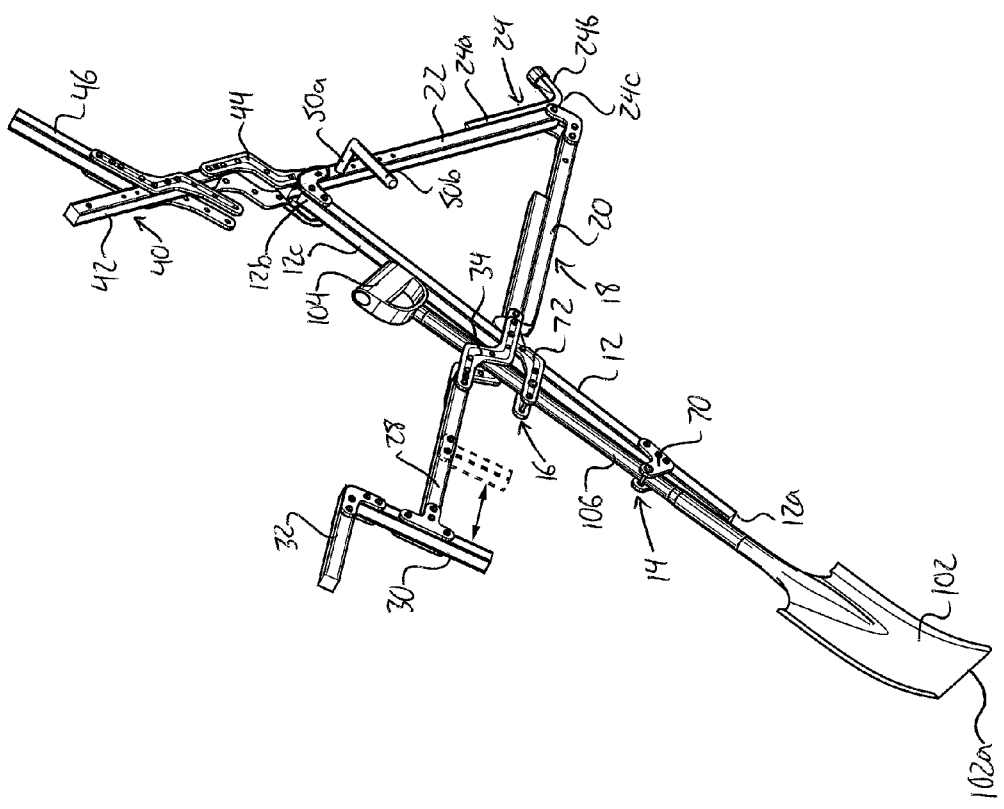
FIG. 6 is a front side perspective view of the shovel accessory and shovel of FIG. 1 during initial assembly of the shovel and accessory in preparation for use of same.

FIG. 6 illustrates installation of the shovel 100 onto the main beam 12 of the accessory 10. First, the bolts 74 and wingnuts 76 are removed from the clamps 14, 16. With the shovel 100 turned on its side (i.e. to place the width of the shovel head 102 in an upright orientation in the plane of accessory to face laterally outward therefrom), the hand grip 104 of the shovel 100 resides in an upright orientation and is slid rearwardly along the topside the main beam 12, during which the upright hand grip 104 passes through the shaft-accommodating opening between the side bracket plates 34 of the front handle arrangement 26. This shaft-accommodating opening has a width (measured between the side bracket plates 34) that is less than a width of the shovel's hand grip (i.e. the axial length of a cylindrical member around which the user wraps his/her hand in conventional use of the shovel without the accessory of the present invention). On the other hand, a height of the shaft-accommodating opening (measured between the main beam 12 and the bottom end 28a of the lower support 28 of the front handle arrangement) exceeds the hand grip width of the shovel. Accordingly, once the shovel's hand grip 104 has passed through this opening in an upright orientation, the shovel is rotated about the longitudinal axis of its handle shaft 106 back into a normal orientation in which the shovel head 102 width and the hand grip lie horizontally, at which point sliding of the shovel's horizontally oriented hand grip downward past the front handle arrangement is blocked by the front bracket side plates 34. With the shovel axially positioned along the main beam so as to situate the shovel head 102 beyond the front end 12a of the main beam 12, the bolts 74 are reinserted and the wingnuts 76 are engaged and tightened on the bolts 74 to clamp the handle shaft 106 of the shovel 100 to the main beam 12. If a full length shovel whose shaft length exceeds the beam length is employed, then the hand grip of the shovel is also fed through the shaft-accommodating openings of the rear handle arrangement 40 accessory before turning the shovel back into an upwardly facing orientation and tightening the clamps 14, 16.

The pivotal connection 36 to the main beam 12 shared by the front handle arrangement 26 and the undercarriage 18 allows adjustment of these components relative to the main beam 12, and thus relative to the shovel shaft 106 lying parallel thereto. A bolted connection 80 between the main beam 12 and the rear frame member 22 of the undercarriage 18 can make use of any one of the series of holes 52 that are also used to mount the detachable side handle 50. Accordingly, pivotal motion of the beam 12 relative to the undercarriage 18 is enabled by temporary removal of the bolt 80, and the undercarriage is pivoted relative to main beam 12 about the pivot pin 36 to set a desired position of the fulcrum point 24c relative to the beam axis and parallel handle shaft axis of the shovel, at which point the bolt 80 is refastened at a one of the bolt holes 52 that aligns with a corresponding bolt hole of the beam 12 proximate the rear end thereof. The illustrated embodiment employs a linear series of bolt holes 52 and an additional pivot point 82 that is defined between the two frame members 20, 22 of the undercarriage 18 near the lower ends thereof to accommodate the motion and relocking of the undercarriage relative to the beam 12. In another embodiment, the bolt holes 52 in the rear frame member 22 may instead be spaced apart along an arcuate path around the axis of the pivot pin 36, for example by providing these holes 52 in side plates attached to the rear frame member 22 rather than directly in the rear frame member itself, in which case the connection between the front and rear frame members 20, 22 may be fixed rather than pivotal.

Pivoting of the undercarriage to allow adjustment of the fulcrum location relative to the main beam allows the accessory to be adjusted for optimal performance and comfort for different users, for different types or models of shovels, for different shovel-related tasks, etc. The shared pivotal connection 36 of the front handle arrangement 26 and undercarriage 18 with main beam 12 also means that relative rotation about the axis of pivot pin 36 can be used to adjust the position of the front handle arrangement relative to the main beam 12. In other embodiments, the front handle arrangement 26 and undercarriage 18 may have separate adjustable connections to the main beam, whereby the front handle position can be adjusted relative to the main beam 12 independently of the undercarriage 18. Likewise, while the illustrated rear handle arrangement is fastened to the main beam 12 via the rear frame member 22 of the undercarriage, other embodiments may allow independent adjustment of these members relative to the main beam 12.

Figure 4:
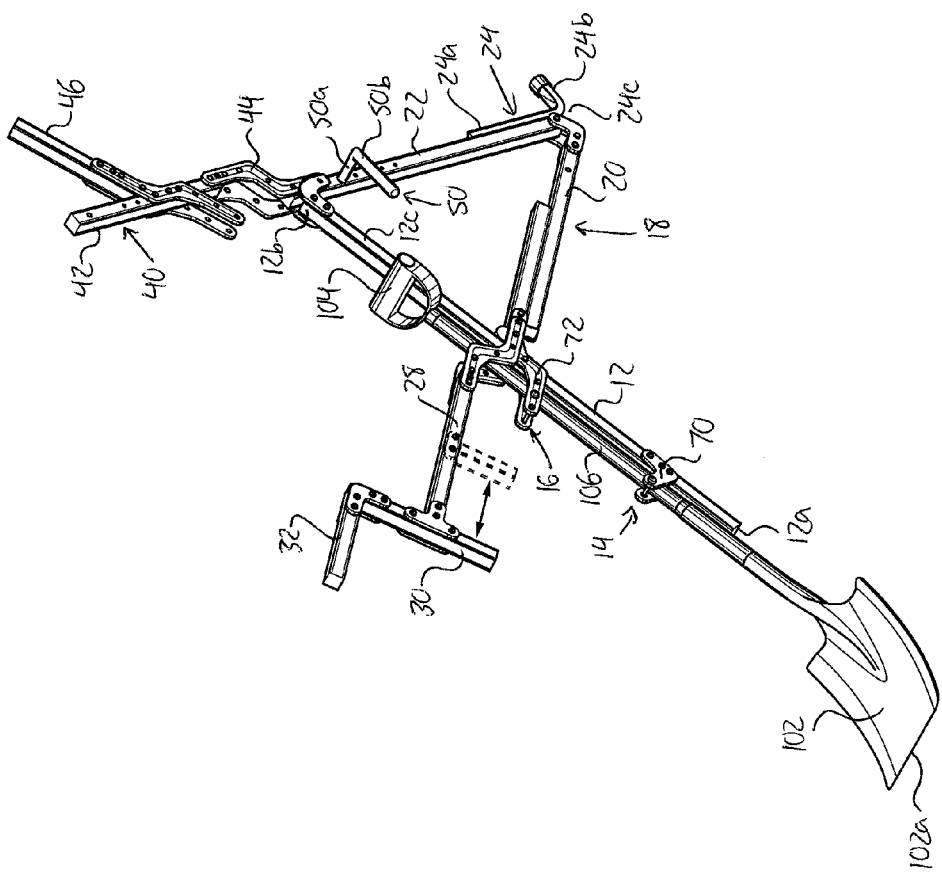
FIG. 4 is a front side perspective view of the shovel accessory and shovel of FIG. 1, including schematic illustration of a height-adjustment mechanism at of a front handle of the accessory.

As shown schematically in FIGS. 4-6 by a broken line illustration of a portion of the cross-piece 30 of the front handle arrangement, the lower support portion 28 of the front handle arrangement 26 may have a telescopic configuration by which its length is extendable and collapsible to allow adjustment of a distance by which the cross-piece 30 and hand grip member 32 is spaced from the main beam 12, thereby providing further configurability by the user for optimal performance and comfort. Similar handle height adjustment may be provided at the rear handle arrangement, for example by providing grip bar with a telescopic construction. The second grip bar 46 may also be adjustably mounted on the first grip bar 42 for adjustment of the height thereon at which it is installed. As shown, as bracket that attaches the second grip 46 to the first grip bar 42 may also extend forwardly of the first grip bar for optional connection of another hand grip to the rear handle arrangement position on the front side of the first grip bar.

The removable bolt 80 that forms the connection of the undercarriage and the rear handle arrangement to the frame is preferably mated with a corresponding wingnut so that the bolt is manually removable without the aid of any tools. When the bolt is removed, the entire accessory can be folded up into a more compact configuration for space-efficient storage or transport, for example to enable transport thereof in the trunk of an average automobile. With the shovel and the bolt 80 removed, the front frame member 20 of the undercarriage can be pivoted up to reside under the rear portion 12c of the main beam 12 in an orientation more parallel thereto. This situates the pivotal connection 82 of the undercarriage frame members beyond the rear end of the beam, and the rear frame member 20 and attached first rear grip bar 42 are pivotal downward toward the topside of the main beam 12 to lie generally parallel to the main beam and the folded-up front frame member 20 of the undercarriage. The folding up of the front frame member 20 into the stowed position under the rear portion 12c of the main beam 12 acts to lay the lower support 20 of the front handle arrangement down into a position lying more parallel to the main beam 12 and reaching toward the front end thereof. Accordingly, through this folding up of the undercarriage and attached handle arrangements, the entire accessory takes on a collapsed state in which the undercarriage frame members 20, 22, rear first grip bar 42 and front lower support 28 all lie more parallel to the main beam 12 than in their deployed positions ready for use of the accessory, thus reducing the overall span of the accessory in a direction perpendicular to the longitudinal axis of the main beam 12.

In a prototype on which the drawings are based, aluminum rectangular tubing was used for each of the main beam 12; the undercarriage frame members 20, 22; the lower support 28, cross-piece 30 and hand grip 32 of the front handle assembly; and the two grip bars 42, 46 of the rear handle assembly. The use of hollow aluminum tubing provided the prototype with a suitable balance between a desired minimal weight and required strength to handle the levering action on the shovel, but it will be appreciated that other materials may be employed. Molded grips may be employed at the gripping areas 32, 42, 46 of the front and rear handle arrangements for improved comfort during use.

While the illustrated embodiment is shown and described as a combination of a conventional shovel with an add-on accessory defining the handle arrangements and fulcrum-defining undercarriage of the present invention, other embodiments would include a shovel apparatus in which a shovel head is likewise carried at a front end of a longitudinal member from which a fulcrum-defining undercarriage is suspended and a pair of handle arrangements are upstanding, without the shovel head necessarily being detachable or having its own dedicated handle shaft separate from the main longitudinal beam or member of the apparatus.

While the illustrated embodiment employs an undercarriage having converging frame members 20, 22 that cooperate with the rear section 12c of the main longitudinal beam to form a triangular frame of notable strength, other undercarriage configurations similarly defining a ground engaging fulcrum point near the rear end of the accessory may be employed.

Since various modifications can be made in my invention as herein above described, it is intended that all matter contained in the accompanying specification shall be interpreted as illustrative only and not in a limiting sense.

The invention claimed is:

1. A shovel accessory for a shovel having a handle shaft and a shovel head attached to an end thereof, the accessory comprising:
   a main longitudinal beam having opposing front and rear ends;
   a shovel attachment mechanism arranged to secure the shovel to the main longitudinal beam in a position laying the handle shaft of the shovel along the main longitudinal beam with the shovel head situated beyond the front end of the main longitudinal beam;
   an undercarriage depending downward from the main longitudinal beam and defining a ground engagement portion at a distance below the main longitudinal beam at a location nearer to the rear end of the main longitudinal beam than to said front end thereof so that the ground engagement portion defines a fulcrum of the main longitudinal beam at said location when the ground engagement portion is in contact with the ground; and
   a front handle arrangement supported on the main longitudinal beam in a position thereabove at an intermediate location therealong between the ground engagement portion of the undercarriage and the front end of the main longitudinal beam;
   a rear handle arrangement supported on the main longitudinal beam in a position thereabove at a rearward position nearer to the ground engagement portion of the undercarriage than said front handle arrangement;
   whereby the front and rear handle arrangements provide points for gripping of the accessory by respective hands of a user to pivot the main longitudinal beam and attached shovel about the fulcrum in order to lift the shovel head thereabout under rearward pulling of the front handle arrangement.

2. The shovel accessory of claim 1 wherein the undercarriage comprises at least one ground wheel for rolling support of the apparatus.

3. The shovel accessory of claim 2 wherein the ground engagement portion is positioned rearward of a rotational axis of the at least one ground wheel to contact the ground under tilting of the shovel accessory rearward about said rotational axis of the at least one ground wheel.

4. The shovel accessory of claim 1 wherein the under carriage comprises front and rear frame members converging downwardly from the main longitudinal beam toward the ground engagement portion to define a generally triangular frame with a rear portion of the main longitudinal beam that spans between points at which the frame members connect to said main longitudinal beam.

5. The shovel accessory of claim 4 wherein the rear handle arrangement and the rear frame member of the undercarriage share a same connection to the main longitudinal beam.

6. The shovel accessory of claim 4 wherein the front handle arrangement and the front frame member of the undercarriage share a common connection to the main longitudinal beam.

7. The shovel accessory of claim 6 wherein the common connection is a pivotal connection defining a pivot axis perpendicular to the main longitudinal beam, and the rear frame member comprises a series of selectable attachment points at which the main longitudinal beam is securable to the rear frame member.

8. The shovel accessory of claim 1 wherein the undercarriage is connected to the main longitudinal beam by a pivotal connection defining a pivot axis perpendicular to the main longitudinal beam to enable adjustment of the location of the ground engagement portion relative to the main longitudinal beam.

9. The shovel accessory of claim 8 wherein the handle grip of the front handle arrangement is adjustably mounted on a lower portion of the front handle arrangement attached to the main longitudinal beam.

10. The shovel accessory of claim 9 wherein the front handle arrangement comprises a telescopic connection between the handle grip and the lower portion of the front handle arrangement.

11. The shovel accessory of claim 1 wherein the rear handle arrangement comprises an upright portion extending upward from the main longitudinal beam and a rearward portion jutting rearward from the upright portion at a point thereon spaced above the main longitudinal beam.

12. The shovel accessory of claim 11 wherein the upright portion comprises an extension portion that reaches upwardly past the point thereon from which the rearward portion extends, the extension portion and the rearward portion defining differently oriented hand grips for selective rearward pulling or downward pushing of the rear handle arrangement about the fulcrum.

13. The shovel accessory of claim 1 wherein the shovel attachment mechanism is arranged to secure the handle shaft of the shovel in place atop the main longitudinal beam.

14. The shovel accessory of claim 13 wherein at least the front handle arrangement comprises a respective shaft-accommodating opening arranged to accommodate passage of the handle shaft of the shovel therethrough.

15. The shovel accessory of claim 14 wherein the rear handle arrangement comprises a rear shaft-accommodating opening arranged to accommodate passage of the handle shaft of the shovel therethrough.

16. The shovel accessory of claim 14 wherein each shaft-accommodating opening has a greater height than width, the height being sufficient to enable passage of a handle grip of the shovel through the shaft-accommodating with the handgrip in an upright orientation and the width being insufficient to allow passage of the handle grip through the shaft-accommodating with the handgrip in a horizontal orientation.

17. The shovel accessory of claim 1 wherein the shovel attachment mechanism comprises a plurality of clamping devices at spaced apart positions along the main longitudinal beam.

18. The shovel accessory of claim 1 comprising a side handle offset to a side of the main longitudinal beam proximate the rear handle arrangement.

19. The shovel accessory of claim 18 wherein the side handle is adjustable in position relative to the main longitudinal beam.

20. The shovel accessory of claim 18 wherein the side handle in adjustable in height relative to the main longitudinal beam.

21. The shovel accessory of claim 18 wherein the side handle in adjustable to reside at either side of the main longitudinal beam.

22. The shovel accessory of claim 1 comprising a detachable side handle selectively attachable in a position offset to a side of the main longitudinal beam proximate the rear handle arrangement.

23. The shovel accessory of claim 22 comprising a plurality of selectable attachment points at which the detachable side handle is attachable.

24. The shovel accessory of claim 23 wherein at least some of the plurality of selectable attachment points are vertically spaced from one another at different heights relative to the main longitudinal beam.

25. The shovel accessory of claim 23 wherein at least some of the plurality of selectable attachment points are defined on the rear handle arrangement.

26. The shovel accessory of claim 23 wherein at least some of the plurality of selectable attachment points are defined on the undercarriage.

27. The shovel accessory of claim 22 wherein the detachable side handle is attachable on either side of the main longitudinal beam.

28. The shovel accessory of claim 1 wherein the undercarriage and the front and rear handle arrangements are all movable relative to the main beam between deployed positions for use of the accessory and stowed positions lying more parallel to the main beam than the deployed positions.

29. A shovel apparatus comprising:
a main longitudinal member having opposing front and rear ends;
a shovel head supported on the main longitudinal member in a position situated beyond the front end of the main longitudinal member;
an undercarriage depending downward from the main longitudinal member and defining a ground engagement portion at a distance below the main longitudinal member at a location nearer to the rear end of the main longitudinal member than to said front end thereof to define a fulcrum of the main longitudinal beam at said location when the ground engagement portion is in contact with the ground; and
a front handle arrangement supported on the main longitudinal member in a position thereabove at an intermediate location therealong between the ground engagement portion of the undercarriage and the front end of the main longitudinal member;

a rear handle arrangement supported on the main longitudinal member in a position thereabove at a position nearer to the ground engagement portion of the undercarriage than said front handle arrangement;

whereby the front and rear handle arrangements provide points for gripping of the accessory by respective hands of a user to pivot the main longitudinal member about the fulcrum to lift the shovel head thereabout under rearward pulling of the front handle arrangement.

30. The shovel accessory of claim 1 wherein a handle grip of the front handle arrangement is adjustable in position relative to the main longitudinal beam.

* * * * *